United States Patent [19]

Kawaguchi et al.

[11] Patent Number: 5,243,453
[45] Date of Patent: Sep. 7, 1993

[54] ANTI-MOISTURE STRUCTURES FOR USE WITH A LIQUID CRYSTAL DISPLAY

[75] Inventors: Takuo Kawaguchi, Chicago, Ill.; Tetsuo Ishikawa, Hitachi; Yoshiaki Takeda, Hitachi; Kousuke Yamada, Hitachi, all of Japan

[73] Assignee: Hitachi, Ltd., Tokyo, Japan

[21] Appl. No.: 664,221

[22] Filed: Mar. 4, 1991

[30] Foreign Application Priority Data

Mar. 2, 1990 [JP] Japan .................. 2-049317

[51] Int. Cl.$^5$ .................. G02F 1/1333; G02F 1/1343
[52] U.S. Cl. .......................... 359/74; 359/83; 359/88
[58] Field of Search ............. 359/83, 88, 74

[56] References Cited

U.S. PATENT DOCUMENTS

| 4,111,533 | 9/1978 | Nakamura et al. | 359/83 |
|---|---|---|---|
| 4,189,912 | 2/1980 | Washizuka et al. | 359/83 X |
| 4,221,112 | 9/1980 | Enomoto et al. | 359/83 X |
| 4,243,302 | 1/1981 | Hanner | 359/50 X |
| 4,247,928 | 1/1981 | Dorfman | 359/83 X |
| 4,294,517 | 10/1981 | Jakubek | 359/83 |
| 4,403,830 | 9/1983 | Gerstner | 359/89 |
| 4,614,406 | 9/1986 | Motoi | 359/83 X |
| 4,643,526 | 2/1987 | Watanabe et al. | 359/88 |
| 4,709,991 | 12/1987 | Hoshikawa | 359/74 X |
| 4,756,105 | 7/1988 | Wagner et al. | 359/83 X |
| 4,763,493 | 8/1988 | Nishite et al. | 340/525 |
| 4,809,078 | 2/1989 | Yabe et al. | 359/83 X |
| 4,842,373 | 6/1989 | Tomofuji et al. | 359/88 |
| 4,906,071 | 3/1990 | Takahara et al. | 359/82 |

FOREIGN PATENT DOCUMENTS

| 59-140424 | 8/1984 | Japan | 359/83 |
|---|---|---|---|
| 63-64022 | 3/1988 | Japan | 359/83 |
| 1-49022 | 2/1989 | Japan | 359/83 |
| 1-245225 | 9/1989 | Japan | 359/83 |
| 2-58023 | 2/1990 | Japan | 359/80 |

OTHER PUBLICATIONS

"Mounting Method for Liquid Crystal Display", IBM Technical Disclosure Bulletin, vol. 29 No. 8, Jan. 1987, pp. 3446-3447.

Primary Examiner—William L. Sikes
Assistant Examiner—Ron Trice
Attorney, Agent, or Firm—Antonelli, Terry, Stout & Kraus

[57] ABSTRACT

In the invention, an outer case is formed of a transmissive hard synthetic resin, a liquid crystal display board is housed in the outer case in a floating state relative to an inner bottom surface of the outer case, and the liquid crystal display board is surrounded with a transmissive synthetic resin poured into the outer case so that anti-moisture resistance is improved.

19 Claims, 8 Drawing Sheets

ANTI-MOISTURE STRUCTURES FOR USE WITH A LIQUID CRYSTAL DISPLAY

BACKGROUND OF THE INVENTION

The present invention relates to a liquid crystal indicator for those products, such as washing machines, which are used in highly moist places.

Because of wide availability and legibility (or easiness to see) of displayed information, liquid crystal indicators are currently used in many types of products such as word processors, TV units, OA (Office Automation) equipment, cameras, clocks/watches as well as automobiles. The application fields and the quantity of those indicators used are continuing to increase rapidly. Liquid crystal indicators also have received attention in the home electric appliance industry producing a variety of products, and are beginning to be adopted in part of the products. However, it has been generally thought difficult to adopt such indicators in products employed under moist conditions, since liquid crystal display sections inclusive of backlights are susceptible to moisture.

While liquid crystal indicators have been recently incorporated in the above type products with some anti-moisture treatment as required, in some cases perfect satisfaction cannot yet be attained with respect to anti-moisture structure, assembling efficiency, etc. Looking briefly at the structure of incorporating liquid crystal indicators in electronic rice cookers, motorcycles or the like which are used in environments exposed to steam or rain, for example, a liquid crystal alone or a liquid crystal with a backlight is directly mounted onto a product control substrate, followed by placing this assembly in a container and enclosing it with a cover. A packing made of rubber or the like is applied to a joint region between the container and the cover, and is then held tight by fastening a number of screws to maintain a sealed condition. Further, in anticipation of the situation wherein a cable line leading from the control substrate is moved around very frequently, an outlet of the cable line is sealed off by applying elastic silicone rubber for injection molding or the like thereto. In some cases, aiming at perfect removal of moisture, desiccants are put in the container accommodating the liquid crystal display section.

However, the above prior art has difficulties in maintaining the inside of the container in a sealed condition because of variations in smoothness of the joint surfaces between the container and the cover, or in the process of applying the silicone rubber to the cable outlet. In addition, with air filled in the container, the air volume is changed due to differences in the ambient temperature, which causes the breathing or respiration through holes in walls of the container, small gaps at the joint surfaces between the container and the cover, or air bubbles in the applied silicone rubber. This allows moisture to enter the container and prevents lasting of a perfectly sealed condition. Consequently, the prior art is not sufficiently suitable for use in those products, such as washing machines, which are employed in extremely watery and moist places.

SUMMARY OF THE INVENTION

An object of the present invention is to provide a general structure of sealing off a liquid crystal display section, an assembling location, a method of connecting the liquid crystal display section and a control substrate for controlling a product, and displayed contents of liquid crystals, which can be adopted with safety even in those products, such as washing machines, which are employed in extremely wet and moist places.

The present invention is featured in coating the surface of a liquid crystal display board with an anti-moisture transparent synthetic resin.

Moisture is blocked off by the anti-moisture synthetic resin so that the liquid crystal display board will not become moist.

BRIEF DESCRIPTION OF THE DRAWINGS

The drawings illustrate embodiments of the present invention in which.

DETAILED DESCRIPTION OF THE PREFERRED EMBODIMENTS

Figure 1:
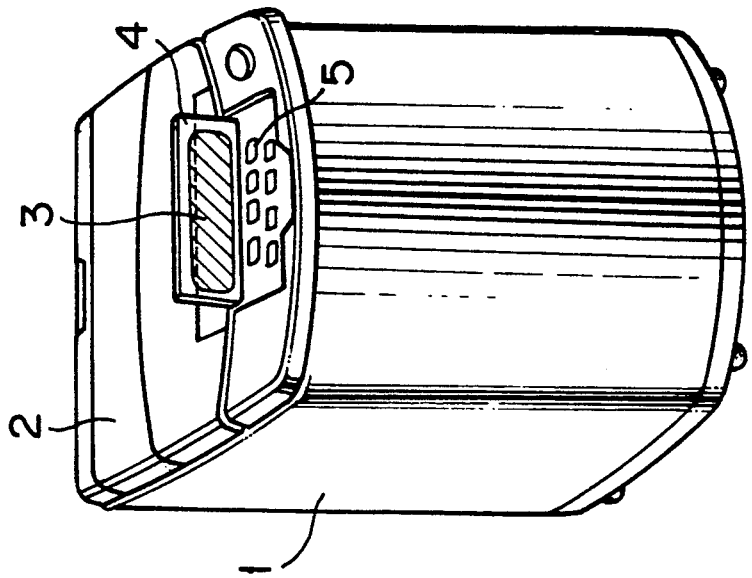
FIG. 1 is an appearance view of a full automatic washing machine.
Figure 2:
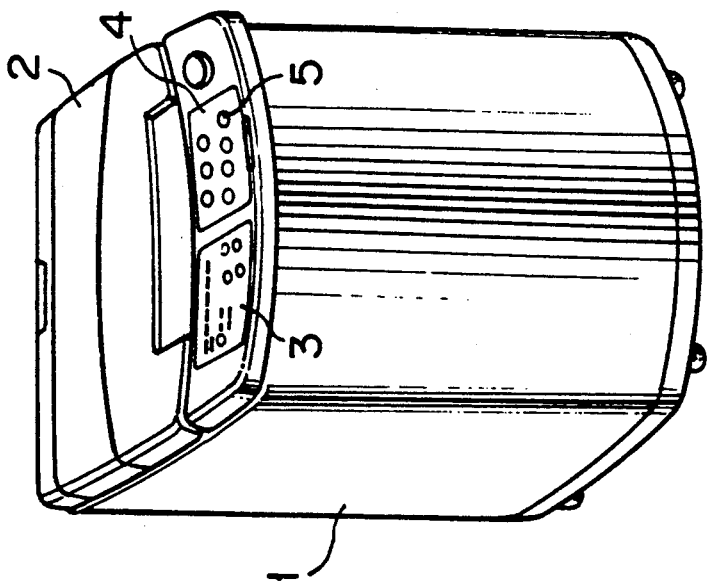
FIG. 2 is an appearance view of a full automatic washing machine with a panel section being different from FIG. 1.

Hereinafter, the present invention will be described by referring to the attached drawings in conjunction with embodiments in which the invention is applied to a washing machine. Washing machines shown in FIGS. 1 and 2 are full automatic ones having the same structure except that their operating panels are different in shape from each other. A twofold outer cover 2 is provided at the top of a body 1 of each washing machine. The outer cover 2 can be opened by folding it to the rear. An operating panel is disposed in front of the outer cover 2. The operating panel is located on the front side for easier operation control of the washing machine.

In the washing machine shown in FIG. 1, a liquid crystal display section 3 is provided on the left-hand side of the operating panel. A cover 4 of an operating section 5 is disposed in the right-hand side. By opening the cover 4, the operating section 5 can be accessed by a user. The reason why the display section 3 is located on the left-hand side is that it can be easily viewed by a right-handed user and water is less likely to splash over the display section 3 when a load of wash is taken out of the washing machine. In other words, the liquid crystal display section 3 is usually susceptible to water and, therefore, it is required to prevent water from splashing over the display section 3 as far as possible.

In the washing machine shown in FIG. 2, the liquid crystal display section 3 is mounted on the inner surface of the cover 4. In this type washing machine, the cover 4 is located centrally of the operating panel. Location of the cover 4 at the center makes water less likely to splash over the liquid crystal display section 3.

The operating section 5 for the liquid crystal display section, which is incorporated in the operating panel, will now be described with reference to FIGS. 3 through 9. The operating section 5 described below is arranged to be suitable for the washing machine shown in FIG. 1.

Figure 3:
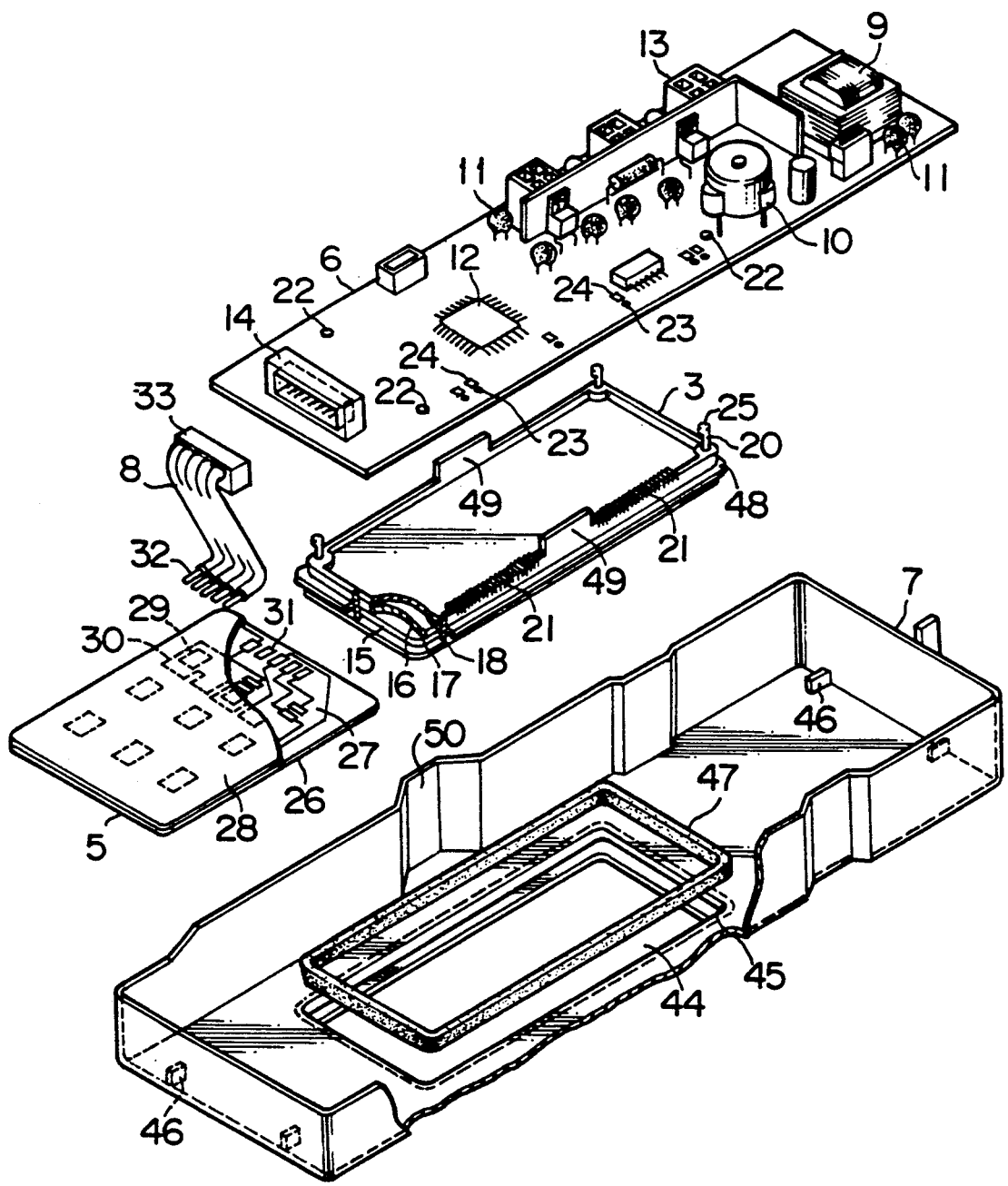
FIG. 3 is an exploded perspective view of a control substrate, a display section, an operating section and a substrate case.

As illustrated in an exploded perspective view of FIG. 3, a control/operating section of the washing machine comprises a control unit and an operating unit. The control unit comprises a control substrate 6 and the display section 3. The operating unit is constituted by the operating section 5 in the form of a membrane switch. The control substrate 6 and the display section 3 are incorporated together in a substrate case 7. The operating section 5 is connected to the control board 6 by an FPC (Flexible Pattern Cable) 8, and functions as the control/operating section of the washing machine.

FIG. 3 shows a state that the control/operating section is turned upside down and then exploded. When the control/operating section is assembled into the operating panel and used in the normal way, the display section 3 is located on the upper side.

On the control substrate 6, there are mounted various electrical parts such as a power transformer 9, a buzzer 10, a capacitor 11, a microcomputer chip 12, a connector housing 13 and a fixed connector 14. Mounting legs of these various electrical parts are soldered to the control substrate 6 at the back side thereof.

The display section 3 comprises a liquid crystal display board 15, a backlight 16 (with EL=electroluminescence), an outer case 17 and an inner case 18. The liquid crystal display board 15 and the backlight 16 are covered with the outer case 17, the inner case 18 and a transparent synthetic resin film 19 to seal off them from the atmosphere.

Support pins 20 are provided at four corners of the outer case 17. A multiplicity of connecting terminal pins 21 are provided along one side of the outer case 17.

Corresponding to the support pins 20, there are respectively formed support pin engagement holes 22 in the control substrate 6. Adjacent insertion holes 23 of the connecting terminal pins 21, a set of connecting patterns 24 are formed on the back side of the control substrate 6 for connection with the connecting terminal pins 21. Though illustrated in small number for brevity, the insertion holes 23 and the connecting patterns 24 are formed in the same number as or larger than the number of the connecting pins 21 in practice.

The display section 3 is attached to the control substrate 6 by respectively inserting the support pins 20 into the support pin engagement holes 22 of the control substrate 6. With this attachment, the connecting terminal pins 21 are aligned such that they are respectively inserted into predetermined insertion holes 23. Contact regions between the connecting terminal pins 21 and the connecting patterns 24 are fixedly joined to each other by soldering.

A check (or slip-off preventing) portion 25 is formed at the distal end of each support pin 20. Because the check portion 25 is positioned on the opposite side of the control substrate 6 after pushing the support pin 20 into the support pin engagement hole 22, the support pin 20 will not be easily slipped off or disengaged from the support pin engagement hole 22.

After assembling the display section 3 and the control substrate 6 together in this way, the assembly is inserted into the substrate case 7 and subjected to the potting process (described later), thereby constituting the control unit.

The operating section 5 in the form of a membrane switch comprises a metallic substrate 26, a lower contact sheet 27 and an upper contact sheet 28. A through hole 30 is defined around each contact 29. The switch is operated such that it is turned on by pushing the contact 29 with a finger from above, and off by releasing the finger from the contact 29. The operating section 5 also has a set of lead connecting patterns 31 respectively corresponding to the contacts 29, and terminals 32 of the FPC 8 are soldered to the lead connecting patterns 31, respectively, for connection between the FPC 8 and the operating section 5. Then, a connector 33 provided at the other end of the FPC 8 is inserted into the fixed connector 14 on the control substrate 6 for connection between the operating section 5 and the control substrate 6.

Figure 5:
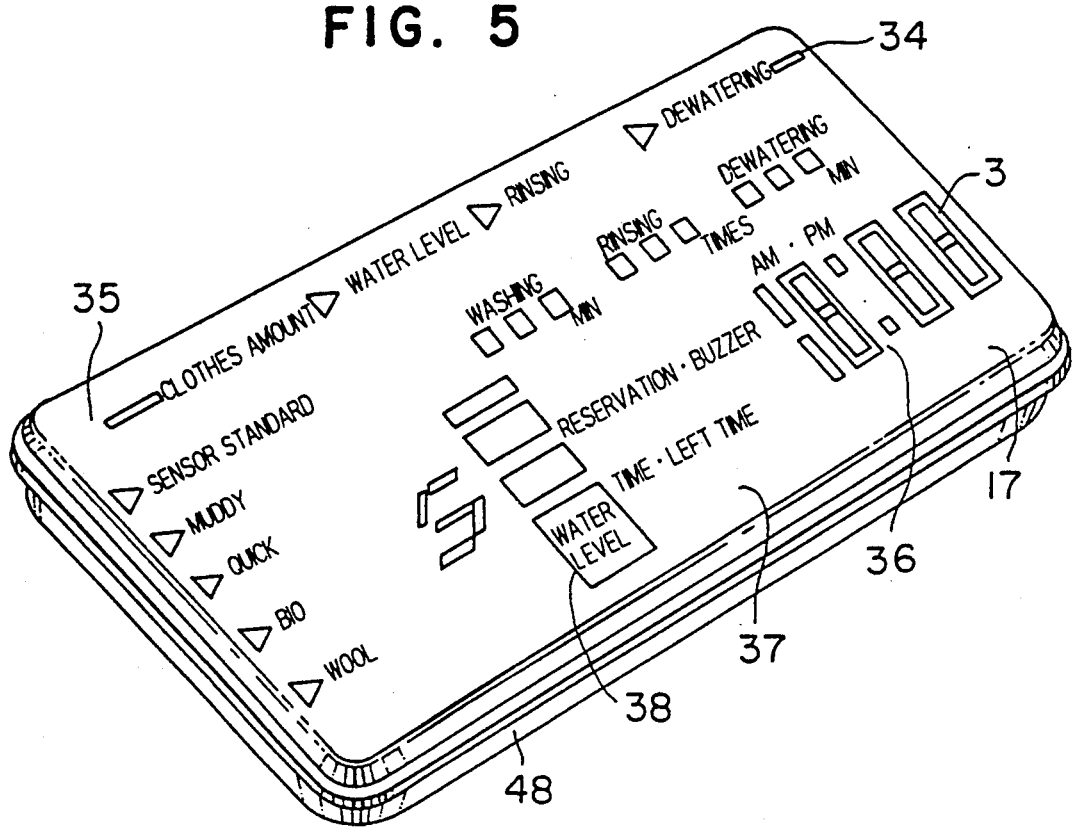
FIG. 5 is a perspective view of the display section as viewed from the display surface side.

The display section 3 will now be described in more detail. FIG. 5 shows the display section 3 as viewed from the front surface side. Indications of washing operation are made by applying a control signal for the control substrate 6 to the liquid crystal display board 15. When the control signal is interrupted, the indications disappear. Depending on the content of the control signal, the indications may be changed in their contents or partially restricted in display areas. Indications of "washing", "rinsing" and "dewatering" on the upper side appear on an operation and progress display 34. The progress of each operation is indicated by the remaining time to be continued.

Indications of "sensor standard", "quick" and "wool" appear on a washing course display 35.

Timer indications 36, 37 of the reserved time is located on the lower right side, and an indication 38 of water level is located on the lower central side, respectively.

Such an arrangement is designed in view of legibility and layout of liquid crystal segment patterns.

The display section 3 constructed as mentioned above is molded using a synthetic resin into an integral structure. This integrally molded structure is intended to seal off the liquid crystal display board 15 and the backlight 16 from the atmosphere. The liquid crystal display board 15 and the backlight 16 (with EL=electroluminescence) are susceptible to water and moisture, because the liquid crystal function and the illuminating function are adversely affected and destroyed by moisture.

The synthetic resin molding of the display section 3 will now be explained.

Figure 6:
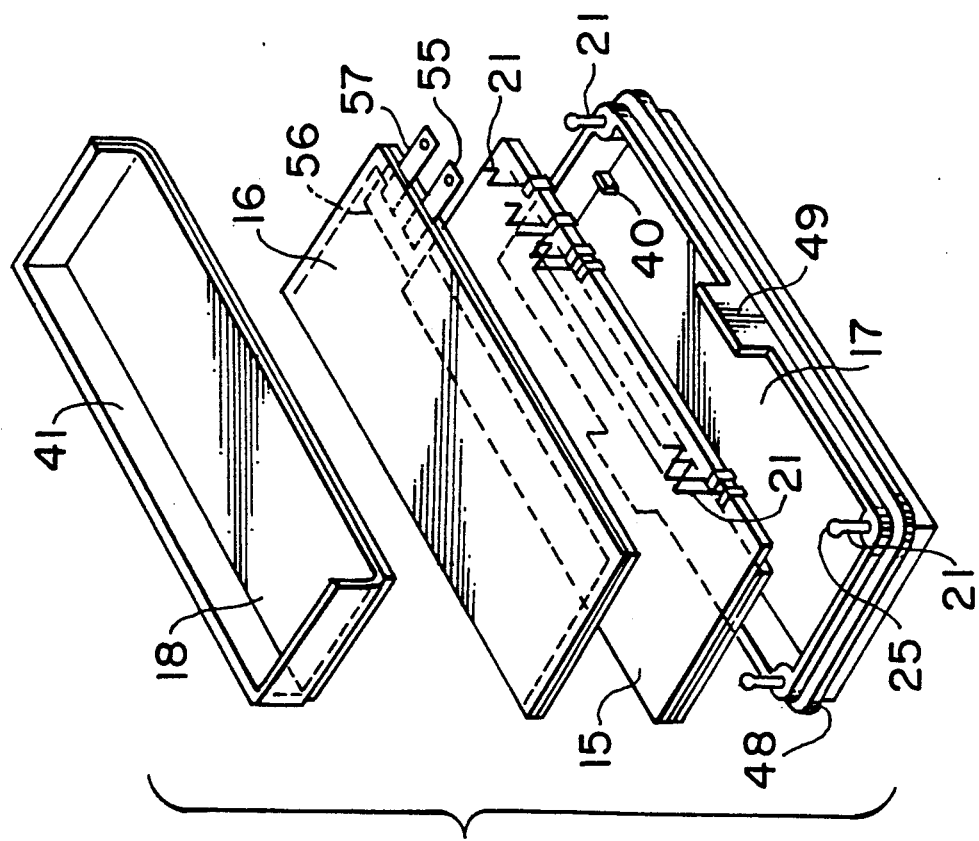
FIG. 6 is an exploded perspective view of the display section.
Figure 8:
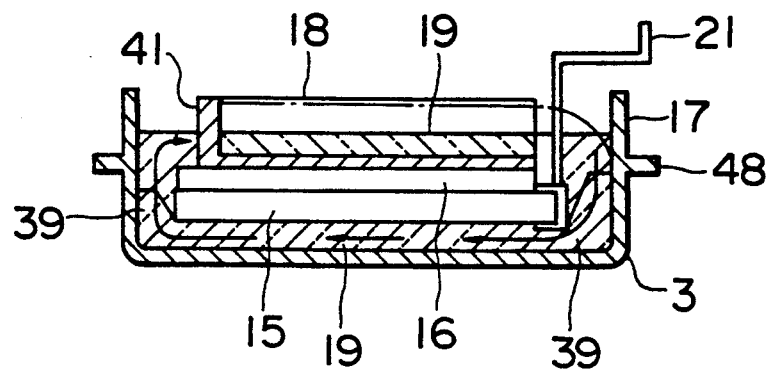
FIG. 8 is a sectional view of the display section in the transverse direction.
Figure 9:
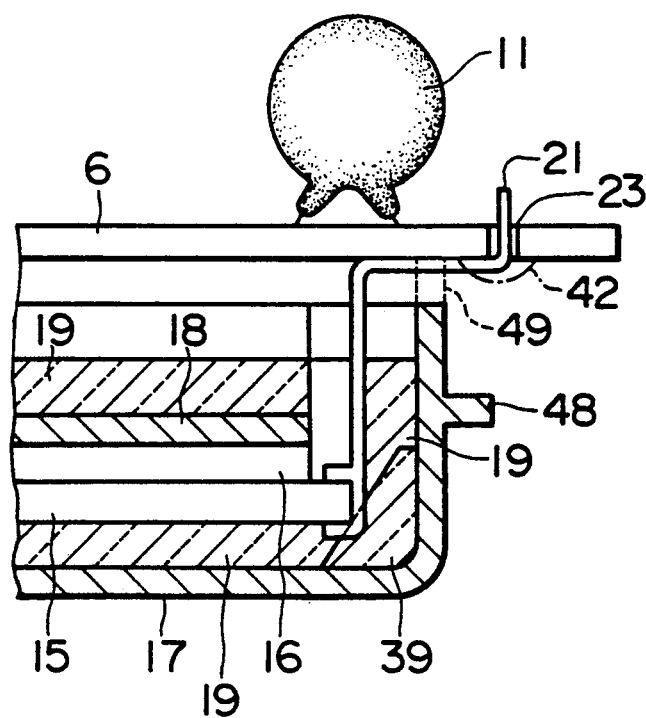
FIG. 9 is an enlarged sectional view of an electrically connecting portion between the display section and the control substrate.

As shown in FIGS. 6, 8 and 9, the liquid crystal display board 15 and the backlight 16, the latter placed above the former, are placed in the outer case 17. The inner case 18 is rested on the backlight 16. Positioning ribs 39, 40 are provided on the inner bottom surface of the outer case 17 near its corners and, therefore, the liquid crystal display board 15 is situated in a floating state relative to the inner bottom surface of the outer case 17 by a little distance. In addition, the liquid crystal display board 15 is positioned within the outer case 17 with a predetermined gap left from inner walls of the outer case 17.

Without providing the positioning ribs 39, 40, the liquid crystal display board 15 can be also floated a little from the inner bottom surface of the outer case 17. For example, the liquid crystal display board 15 and the backlight 16 may bonded to each other using an adhesive or two sided adhesive tape, and the backlight 16 is bonded to the inner case 18 using an adhesive or two sided adhesive tape. Then, latches are provided at the ends of the inner case 18, and the inner case 18 is latched on the upper edges of the outer case 17 so as to make the liquid crystal display board 15 floated.

The inner case 18, into which liquid synthetic resin material is first poured, has three walls 41. The remaining one side of the inner case 18 has no wall. The liquid synthetic resin material poured into the inner case 18 is allowed to flow out through the above one side not having the wall 41, followed by flowing as indicated by the chained arrows in FIG. 8, so that the synthetic resin film 19 is formed to surround the liquid crystal display board 15 and the backlight 16. The liquid synthetic resin film 19 serves to keep the liquid crystal display board 15 and the backlight 16 sealed from the atmosphere.

Alternatively, the inner case 18 may be arranged such that the walls 41 are provided in all the four sides thereof and an outlet allowing the liquid synthetic resin material to flow out therethrough is provided in one wall.

If it is only intended to surround the liquid crystal display board 15 and the backlight 16 with the synthetic resin film 19, there would be no need of using the inner case 18 and considering a flow of the liquid synthetic resin material. The foregoing arrangement of the present invention has been contrived to avoid air bubbles from being entrained in the synthetic resin film 19. If air bubbles are mixed in the synthetic resin film 19, it would be hard to view the display. Since a liquid crystal display is inferior to a CRT display in resolution, the presence of air bubbles markedly adversely affect viewing.

Briefly consider now the occurrence of air bubbles. If the inner case 18 were not used and the liquid synthetic resin material were flowed at a time from the surroundings of the liquid crystal display board 15 into a space defined between the outer case 17 and the liquid crystal display board 15, no path allowing air in the space to escape therethrough would be present and the trapped air would be mixed into the synthetic resin film 19.

In view of the above, according to the present invention, the inner case 18 is provided and the liquid synthetic resin material is flowed through one side of the inner case 18. With such an arrangement, the air existing in the space between the outer case 19 and the liquid crystal display board 15 is forced to be pushed away by the liquid synthetic resin material flowing into the space through the one side of the inner case 18. Consequently, the space is filled with only the liquid synthetic resin material into which no air will be mixed.

Elimination of the mixing of air serves to improve a sealing capability as well as legibility. The presence of mixed air bubbles is also disadvantageous in providing paths through which the atmosphere may intrude. It is thus preferable to suppress the occurrence of air bubbles from that standpoint as well.

The foregoing arrangement that the wall 41 of the inner case 18 on one side is entirely removed is to expedite the outflow of the liquid synthetic resin material from the inner case 19. From the viewpoint of suppressing the occurrence of air bubbles as far as possible, the outlet for the liquid synthetic resin material is desirably formed by cutting out the wall 41 at its center.

Moreover, it is desirable that the outlet is provided on one of the long sides of the inner case 18. This is equally applied to the case where the wall 41 on one side is totally removed to provide the large-sized outlet. This is advantageous in effectively pushing out the air in the aforesaid space. In other words, the liquid synthetic resin material falling from the long one side of the inner case 18 and flowing to the space serves to facilitate purging of the air toward the exterior. If the outlet was provided on one of two short sides of the inner case 18, the liquid synthetic resin material would tend to run toward the gap between the outer case 17 and the liquid crystal display boar 15, resulting in a fear of impeding perfect discharge of the air in the space. Another fear is that the liquid synthetic resin material might be so cooled as to be less fluid until reaching the opposite end from the outlet.

A method of filling the liquid synthetic resin material while suppressing the occurrence of air bubbles, without use of the inner case 18, is also feasible. This method can be realized by positioning a gate of a pouring unit, out of which the liquid synthetic resin material is flown, just above the gap defined between the outer case 17 and the outer periphery of the liquid crystal display board 15. The liquid synthetic resin material flowing out of the gate is forced to flow from one side of the gap toward the inside of the outer case 17, and then through the space between the outer case 17 and the liquid crystal display board 15, as indicated by the chained arrows in FIG. 8, thereby forming the synthetic resin film 19 to surround the liquid crystal display board 15 and the backlight 16. Since the liquid synthetic resin material is filled into the space while purging out the air through the one side left open, air bubbles will not be mixed into the synthetic resin film 19.

The connecting terminal pins 21 for the liquid crystal display board 15 and the backlight 16 are each also covered over a region from a root to an intermediate portion with the synthetic resin film 19, so that the root of each connecting terminal pin 21 is sufficiently sealed from the atmosphere. The reason for locating the connecting terminal pins 21 on the side through which the liquid synthetic resin material is poured is to make the connecting terminal pins 21 more compatible with and more tightly adherent to the liquid synthetic resin material. As the liquid synthetic resin material is hardened with the lapse of time, the sealing capability is increased by surrounding the connecting terminal pins 21 with the liquid synthetic resin material still being soft enough at an earlier time.

The backlight 16 is provided for the purpose of making the display of the liquid crystal display board 15 more legible or easier to see. Alternatively, the display may be indicated by the liquid crystal display board 15 alone without adding the backlight 16. In this case, only the liquid crystal display board 15 is covered with the synthetic resin film 19.

Furthermore, the liquid crystal display board 15 and the backlight 16 are not always necessarily placed directly one above the other. As an alternative, a spacer or the like may be interposed between the liquid crystal display board 15 and the backlight 16, and the resulting assembly may be covered with the synthetic resin film 19. In this case, the synthetic resin film is formed in a space therebetween as well.

In the display section 3, the user views the displayed contents of the liquid crystal display board 15 from the front surface of the outer case 17. It is of course desirable that the outer case 17 has high transparency. In view of this, an acrylic resin was used as the synthetic resin material. Because the inner case 18 does not make up the display surface, it may be formed of any type of resin other than a transparent resin.

The outer case 17 doubles as a protection case for both the liquid crystal display board 15 and the backlight 16, and therefore is desirably formed of strong hard material. So long as the material is hard and highly transparent, the outer case 17 may be formed of any synthetic resin and is not limited to an acrylic resin. Use of the hard material is also effective in making the display surface less susceptible to scratches and maintaining the display at a high degree of quality.

In this embodiment, a synthetic resin material called silicone gel was employed as the synthetic resin film 19. The silicone gel is highly transparent, soft like rubber, and further air-tight. While an epoxy resin having high transparency may be used instead, the silicone gel is more desirable in point of having softness as well. Although hard synthetic resins are durable, there is a fear that they may not be compatible with the liquid crystal display board 15 because of different coefficients of thermal contraction. The liquid crystal display board 15 is made up by sandwiching a liquid crystal material between two glass plates in a sealed state, and pasting a polarizing film onto each glass plate.

When forming the synthetic resin film 19, the liquid synthetic resin is poured into the outer case 17. Being cooled and hardened, the synthetic resin is contracted. The synthetic resin has a higher coefficient of thermal contraction than the glass plates sandwiching therebetween the liquid crystal, resulting in a fear that the glass plates may break. To prevent the breakage of the glass plates, this embodiment uses a material which remains soft even after hardening, like silicone gel. In practice, the silicone gel is poured at the normal temperature and heated at 70° C. to speed up the hardening process. Even if the silicone gel is contracted upon cooling and hardening, this contraction will not result in the breakage of the glass plates because the silicone gel remains soft.

The display section 3 gives various operating indications of the washing machine, and therefore must have a large display surface. In practice, the display section 3 is required to be 13 cm long in the longitudinal direction and 4 cm wide in the transverse direction. Further, in consideration of fluidity and sealing capability of the liquid synthetic resin material, the thickness of the synthetic resin film 19 was set as follows. The gap between the liquid crystal display board 15 and the inner bottom surface of the outer case 17 is in a range of 0.3 mm to 2 mm, whereas the gap between the liquid crystal display board 15 and the side walls of the outer case 17 is over 1 mm along the sides extending in the longitudinal direction and below 0.5 mm along the sides extending in the transverse direction. The thickness of the synthetic resin film on the opposite side to the display surface is desirably slightly greater than that on the display surface side.

The reason of sealing the liquid crystal display board 15 will now be described briefly.

The liquid crystal material put between the two glass plates is sealed in such a manner that peripheral joints of the glass plates are tightly bonded using an adhesive to prevent the liquid crystal material from flowing out. With this sealing structure, the sealed joints will not be adversely affected even if exposed to moisture. The polarizing sheet pasted onto the glass sheet is susceptible to moisture. Specifically, upon exposure to moisture, the polarizing sheet would lose its function as a polarizing sheet soon and fail to develop the polarizing action because it would appear white or cloudy when viewed from the front surface. In liquid crystal displays used in highly moist places like washing machines, therefore, it is essential to protect the liquid crystal display board 15 by keeping it under a sealed condition.

Though referred to briefly above, the soldering between the connecting terminal pins 21 and the connecting patterns 24 will now be described in detail.

As shown in FIG. 9, the connecting terminal pins 21 are respectively inserted into the insertion holes 23 and soldered at 24 to the connecting patterns 24. Since a soldering tank cannot be utilized, the soldering work is carried using an automatic soldering machines. In order to facilitate the soldering work, the connecting terminal pin 21 is folded twice into a hook-like shape so that the soldered portion 42 is located outside of the outer case 17. If the soldered portion 42 was located inside of the outer case 17, the soldering work would become difficult owing to the small gap between the outer case 17 and the control substrate 6.

Figure 4:
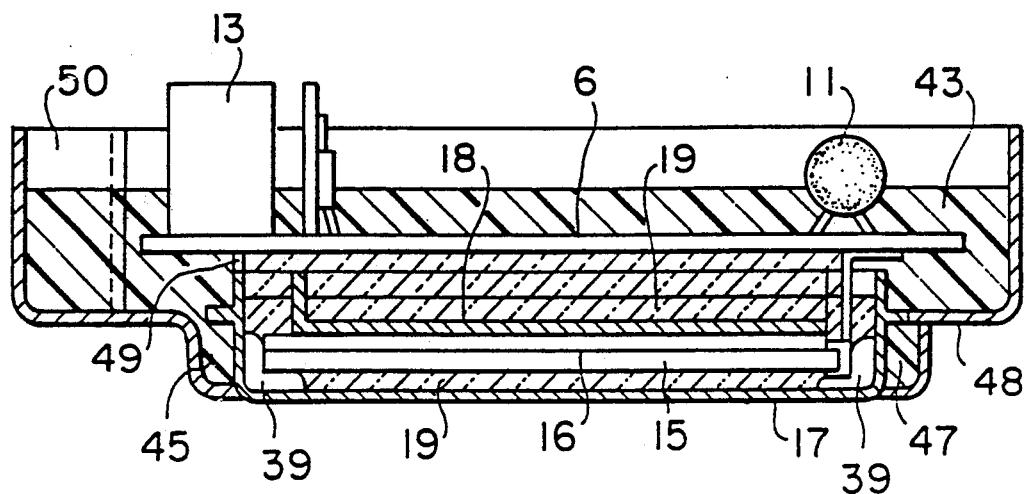
FIG. 4 is a sectional view of the control substrate and the display section both sectioned in the transverse direction.

After completion of the soldering work, the display section 3 and the control substrate 6 are set in the substrate case 7, and a urethane resin is poured into the substrate case 7 for the purpose of a potting process, as shown in FIG. 4. As a result, the control substrate 6 is embedded in a synthetic resin layer 43. This potting or embedding process will be explained in detail with reference to FIGS. 3, 4 and 9.

A hole 44 in which the display section is to be fitted is defined in the substrate case 7. The fitting hole 44 is an opening over most of its area. A receiving step 45 is formed along the inner periphery of the fitting hole 44. Four support ribs 46 are provided on the inner surfaces of walls of the substrate case 7 near its corners and opposite to each other in the longitudinal direction.

A packing 47 is previously fitted to the receiving step 45 of the fitting hole 44, so that the display section 3 is supported by the packing 47. The packing 47 is formed of a urethane foam. Alternatively, it may be formed of elastic synthetic resins having independent foamed cells, rubber or the like. A flange 48 is provided along the outer periphery of the outer case 17 of the display section 3, allowing the packing 47 to be held between the receiving step 45 and the flange 48. The outer case 17 is sized such that it is fitted at the outer periphery to the opening of the fitting hole 44.

The control substrate 6 is received by the support ribs 46 of the substrate case 7 and set in the substrate case 7 in a floating state by a little distance relative to the bottom surface thereof.

Furthermore, a pair of projections 49 are provided on opposite upper edges of the outer case 17 of the display section 3. These projections 49 each serve to secure a gap between the upper edge of the outer case 17 and the control substrate 6. Accordingly, when the control substrate 6 is set into the substrate case 7, the connecting terminal pins 21 will not undergo undue forces tending to press and bend them. This eliminates a fear that the connecting terminal pins 21 may be so buckled as to make contact between two adjacent pins.

The synthetic resin layer 43 formed by the potting process fills the gap between the outer case 17 and the control substrate 6 as well as the space above the control substrate 6, thereby increasing the effect of sealing the control substrate 6. In addition, a bulged portion 50 of the substrate case 7 serves as a fluid reservoir of urethane resin used for the potting purpose. The urethane resin is poured through the bulged portion 50 to spread over the entire gap and space. The packing 48 functions to prevent the urethane resin from flowing out.

Figure 7:
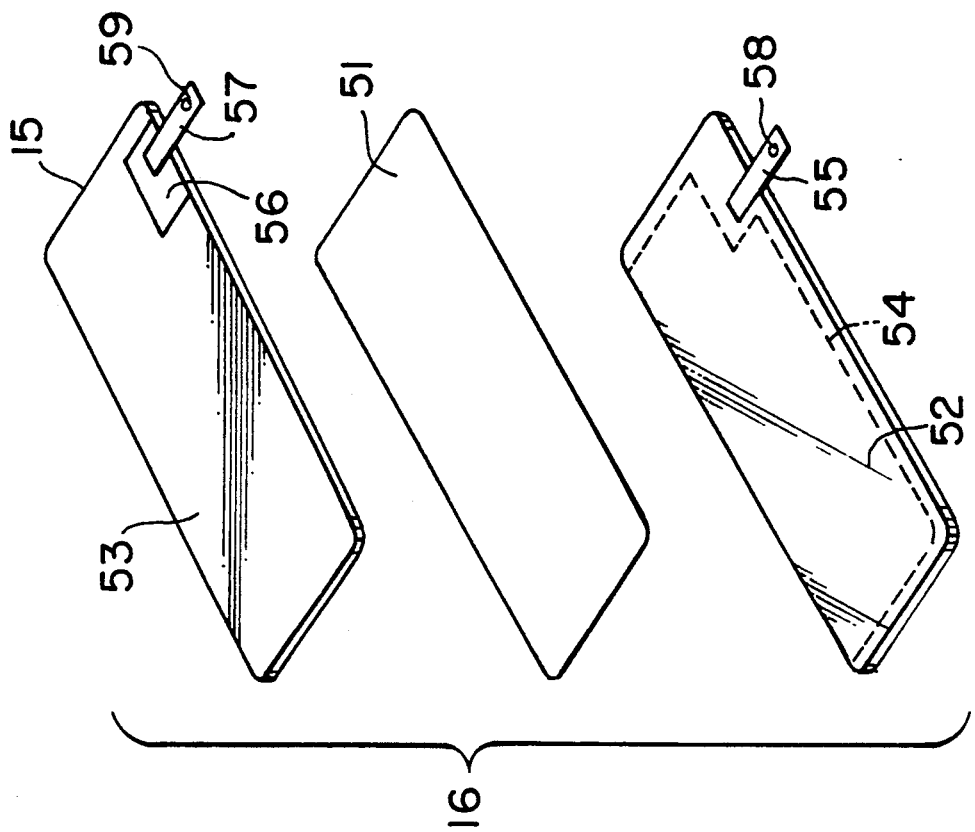
FIG. 7 is an exploded perspective view of a backlight.

The backlight 16 (with EL) will now be described in detail with reference to FIGS. 6 and 7.

The backlight 16 comprises an illuminant 51 with electroluminescence (EL), a transparent electrode plate 52 and a reflecting electrode plate 53. A silver electrode 54 is provided along edges of the transparent electrode plate 52. The remaining portion of the transparent electrode plate 52 except for the electrode 54 is transparent. A terminal 55 is provided on the electrode 54. The reflecting electrode plate 53 is made of aluminum and has a terminal 57 fixed thereto through a connecting plate 56.

The illuminant 51 is sandwiched between the transparent electrode plate 52 and the reflecting electrode plate 53. These three members are interconnected together by an adhesive.

The backlight 16 is arranged such that the transparent electrode plate 52 is joined to the liquid crystal display board 15. The light emitted from the illuminant 51 serves, through the transparent electrode plate 52, to assist brightness of the display provided by the liquid crystal display board 15.

The illuminant 51 with EL is susceptible to moisture and would soon fail to emit light if exposed to moisture. This is because, under influence of moisture, black dots disabling emission of light are produced in the illuminant. By covering the backlight 16 with the synthetic resin film 19 to keep it sealed from the atmosphere, the illuminant 51 can be prevented from reducing its light emitting function due to moisture.

Small holes 58, 59 are respectively bored in the terminals 55, 57. The corresponding connecting terminal pins 21 are inserted into the small holes 58, 59 for connnecting the electrodes 52, 53 to the control substrate 6. These two connecting terminal pins 21 to be inserted to the small holes 58, 59 are provided on the liquid crystal display board 15, but are separated from the electric circuit for the liquid crystal display board 15. These two pins 21 are provided exclusively for the backlight 16.

Figure 10:
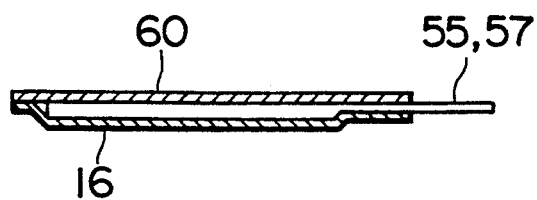
FIG. 10 is a sectional view of a backlight according to another embodiment.
Figure 11:
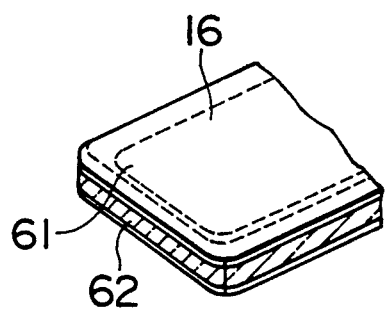
FIG. 11 is an enlarged perspective view of a portion where a packing is attached to the backlight shown in FIG. 10.

The backlight 16 shown in FIGS. 10 and 11 are designed with an aim of further increasing antimoisture resistance. The backlight 16 is enclosed by a water-proof package film 60 in a sealed condition. The package film 60 is formed of fluoroplastics such as Teflon. Thus, the backlight 16 is covered doubly with the water-proof package film 60 and the synthetic resin film 19 for further improving the effect to protect it from moisture.

A packing 61 and an adhesive 62 are shown in FIG. 11. This arrangement is intended for providing better seating of the backlight 16 onto the liquid crystal display board 15 when they are joined to each other. As shown in FIG. 10, the underside of the backlight 16 is stepped along its peripheral edge. To eliminate such a stepped edge, the packing 61 is fitted to the lower peripheral edge of the backlight 16 and the adhesive 62 is then applied to the lower surface of the packing 61, allowing the backlight 16 to be joined to the liquid crystal display board 15 more conveniently. The packing 61 is desirably formed of an elastic foam having independent foamed cells, such as a urethane foam.

Figure 12:
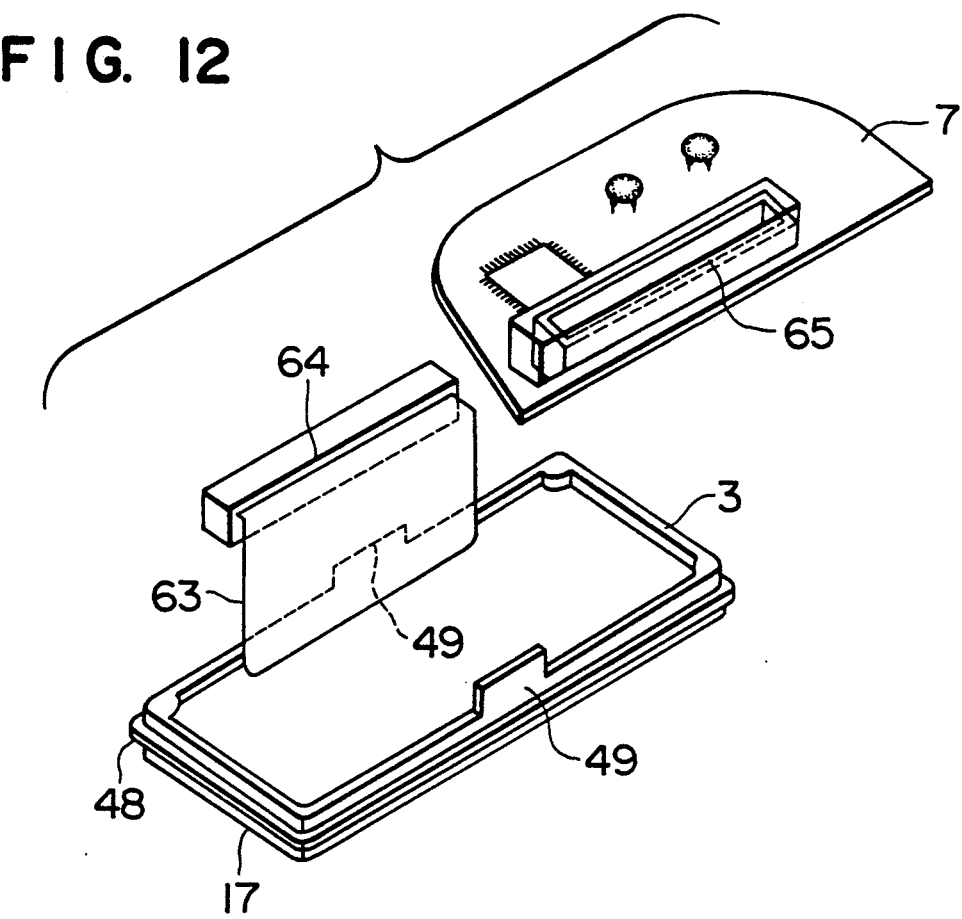
FIG. 12 is an exploded perspective view of a connecting portion between the display section and the control substrate according to another embodiment.

In an embodiment shown in FIG. 12, an FPC 63 is used in place of the connecting terminal pins 21. A connector 64 is provided at the distal end of the FPC 63 and is connected to a fixed connector 65 on the control substrate 6. Afterward, as with the foregoing embodiment, the display section 3 and the control substrate 6 are set into the substrate case 7 and the potting process is applied to embed the FPC 63, the connector 64 and the fixed connector 65 in the synthetic resin layer.

Figure 13:
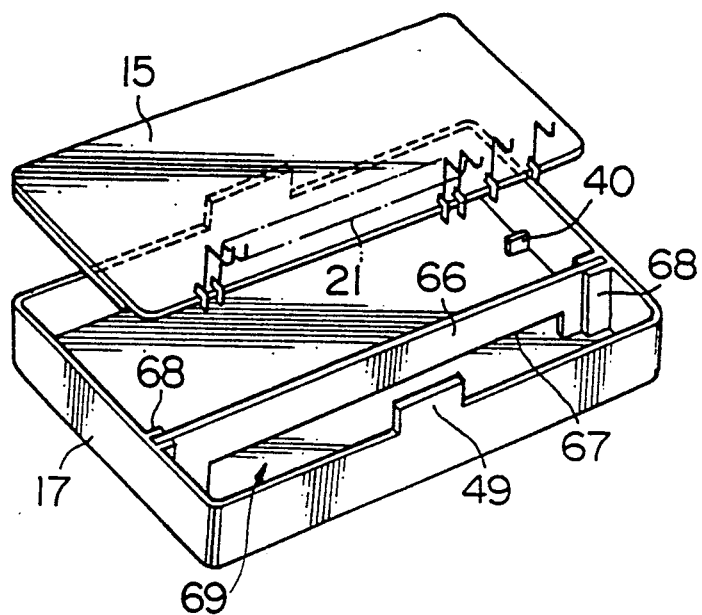
FIG. 13 is an exploded perspective view of the display section according to another embodiment.

In an embodiment shown in FIG. 13, the outer case 17 is modified in its configuration. The inner case 18 can be dispensed with by using this modified outer case 17. More specifically, a partition 66 is provided in the outer case 17. A flow passage hole 67 is defined along the lower end of the partition 66. The partition 66 is mounted in the outer case 17 by being engaged with a pair of engagement portions 68. The partition 66 and the outer case 17 are separated from each other for convenience of molding. This is because of the presence of the flow passage hole 68, a complicated forming mold must be used to integrally mold the outer case 17 and the partition 66. To avoid this, the outer case 17 and the partition 66 are structured separately. In this embodiment, the display section 3 is formed as follows. The liquid crystal display board 15 is first fitted in the outer case 17, and transparent liquid synthetic resin material is then poured into a pouring groove 69 in the front side of the outer case 17. The synthetic resin material flows through the flow passage hole 67 and into a space between the underside of the liquid crystal display board 15 and the outer case 17. While purging air out of the space, the synthetic resin goes on filling the space, followed by moving upwards on the rear side of the outer case 17 to fill a space above the liquid crystal display board 15. As a result, the liquid crystal display board 15 is entirely covered with a transparent synthetic resin film to be sealed from the atmosphere. In addition, since the synthetic resin is filled while purging air out of the space, no air is mixed into the synthetic resin film. This embodiment can prevent the occurrence of air bubbles due to mixing of air without using the inner case 18. Although the illustrated embodiment is not provided with a backlight, it is also possible to combine the backlight with the liquid crystal display board 15.

Figure 15:
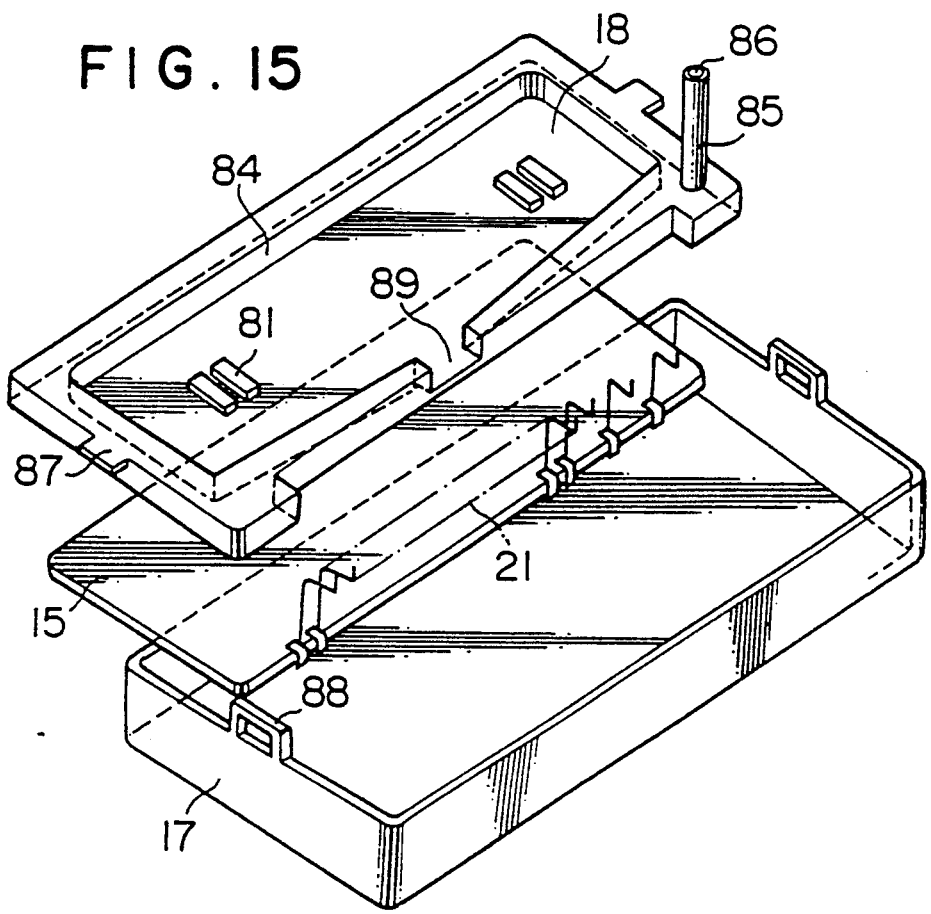
FIG. 15 is an exploded perspective view of the display section according to still another embodiment.
Figure 16:
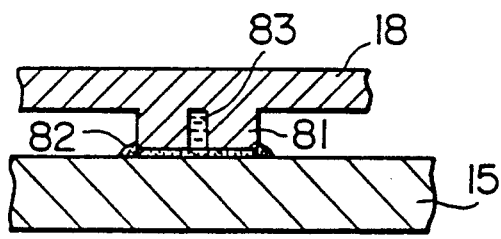
FIG. 16 is an enlarged sectional view of a bonded portion between an inner case and the liquid crystal display board.
Figure 17:
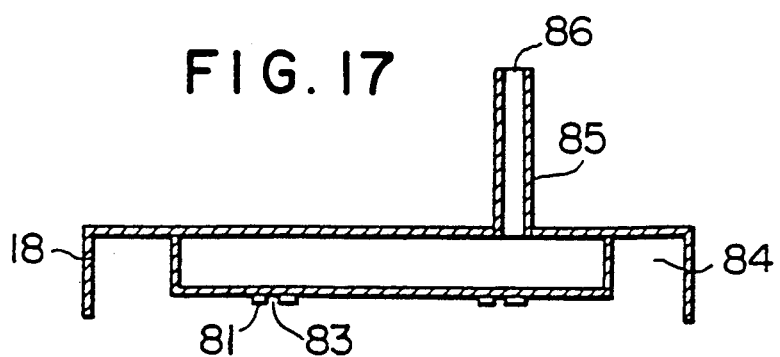
FIG. 17 is a sectional view of main parts of the inner case.

In an embodiment shown in FIGS. 15, 16 and 17, the inner case 18 is modified in its configuration. Two pairs of contact ribs 81 as shown in FIG. 16 project from the inner side of the inner case 18, i.e., from the surface of the inner case 18 facing the upper side of the liquid crystal display board 15, to form a fluid reservoir 83 between contact ribs 81 for an adhesive 82. After applying the adhesive 82 to the fluid reservoirs 83, the inner case 18 is bonded to the liquid crystal display board 15 so that they are rigidly joined to each other with the adhesive 82 spreading over the flat portions of the contact ribs 81. The adhesive 82 is preferably made of flexible material having a Shore hardness less than 95 degrees at −10° C. for the purpose of reducing a pressure load imposed on the polarizing sheet pasted to the surface of the liquid crystal display board 15. Suitable examples are adhesives based on silicone, acryl, urethane, synthetic rubber, epoxy, polyamide, ethylene acetate vinyl, etc.

Support pins 87 are provided on the inner case 18 and engaged with supports 88 provided on the outer case 17, respectively, for properly positioning the inner case 18 and the liquid crystal display board 15. Accordingly, a certain gap is left between the liquid crystal display board 15 and the inner bottom surface of the outer case 17. Such an arrangement eliminates the need of providing contact projections on the inner side of the outer case 17 to leave a gap between the liquid crystal display board 15 and the inner bottom surface of the outer case 17, remarkably alleviates concentration of stresses produced by differences in coefficients of thermal contraction of the respective parts onto the contact portions therebetween, and further avoids the disadvantage of occurrence of air bubbles.

The peripheral edge of the inner case 18 is protruded as shown in FIG. 15, and a pouring port 89 is cut out at part of the protruded peripheral edge. When a transparent synthetic resin for injection molding is poured into the upper side of the inner case 18, the resin flows downwards through the pouring port 89 to fill the gap between the inner case 18 and the liquid crystal display board 15 as well as the gap between the outer case 17 and the liquid crystal display board 15, while gradually spreading in a fan-like shape. This enables the resin to flow without leaving air in those gaps. Also, at the time the above gaps are completely filled with the transparent synthetic resin, an air reservoir 84 is formed by a hollow space in the peripheral edge of the inner case 18. In addition, a communicating pipe 85 is provided on part of the inner case 18 and has its opening end 86 open to the atmosphere, thereby communicating the interior of the air reservoir 84 with the atmosphere. With such an arrangement, the gas component purged out of the poured transparent synthetic resin under high-temperature, high-moisture environments, to which the product is entirely exposed, is allowed to escape from the air reservoir 84 to the atmosphere through the communicating pipe 85, preventing the occurrence of air bubbles or separation at the interface between the outer case 17 and the liquid crystal display board 15.

The foregoing explanation has been made as incorporating a display drive circuit, which drives the display of the liquid crystal display board 15, on the control substrate 6 together. The display drive circuit for the liquid crystal display board 15 may be separated from the control substrate 6 such that it is incorporated into the display section 3 and covered with a synthetic resin film therewith. Such an arrangement greatly simplifies connection means between connecting pins of the liquid crystal display board 15 and the display drive circuit. More specifically, without using the long connecting pins, the display drive circuit (IC) can be connected through printed wirings to respective terminals corresponding to the connecting pins. Furthermore, since the connecting section is simplified into small size, it can be embedded together with the display drive circuit in the synthetic resin film surrounding the liquid crystal display board 15, making the connecting section more resistant to moisture. The display drive circuit and the control substrate 6 can be interconnected by two or several lead wires, so that arrangement and connection of the control substrate 6 with respect to the display section 3 are also facilitated. Since a load current of the liquid crystal display board 15 is very small and the display drive circuit (IC). produces no significant heating, there arises no trouble when the display drive circuit is molded or embedded together with display section 3 in the synthetic resin.

In a broad aspect, a liquid crystal is an organic optical substance. Liquid crystals belong to a group of semi-solids. Some solids exhibit properties of an organic optical substance. Therefore, the term "liquid crystal" implies organic optical substances including semi-solids, solids, etc.

Figure 14:
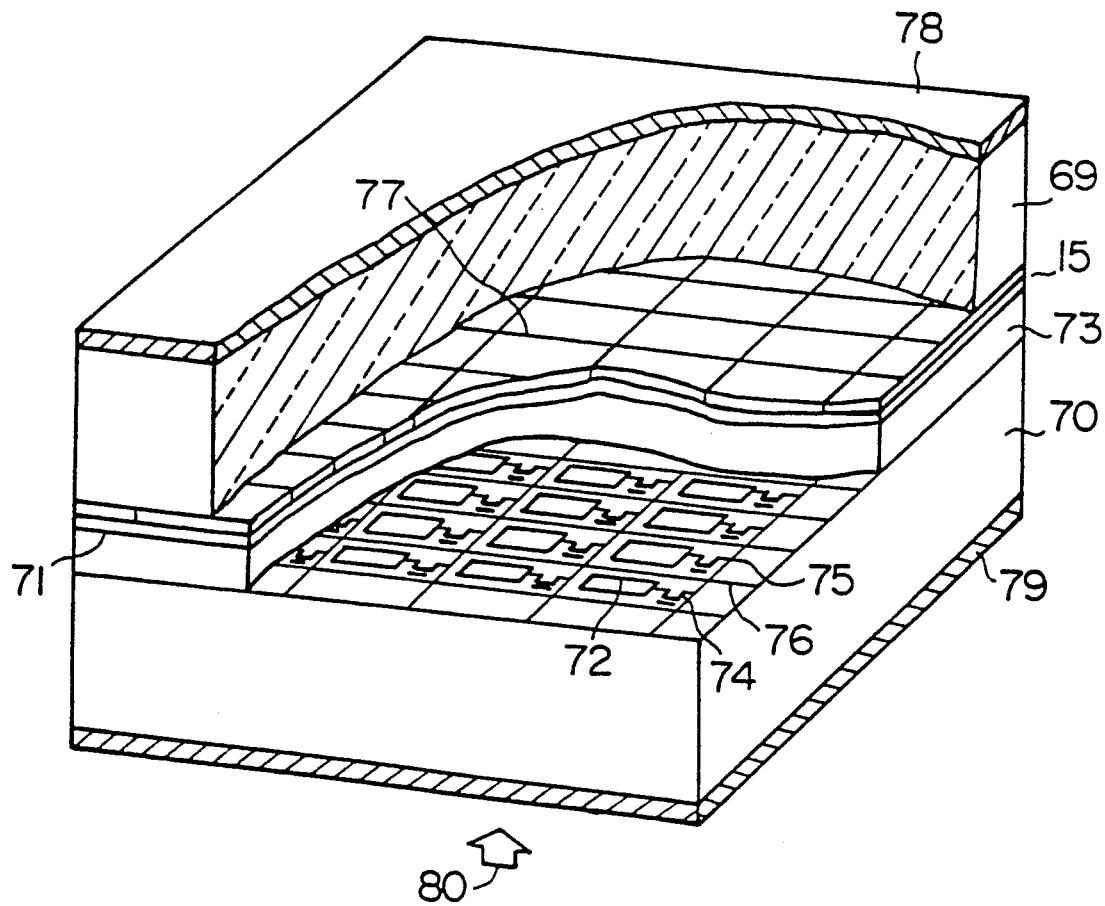
FIG. 14 is a perspective view, partially broken away, of a liquid crystal display board.

FIG. 14 shows one practical arrangement of the liquid crystal display board 15.

The liquid crystal display board 15 comprises an upper glass substrate 69, a lower glass substrate 70, a pair of transparent electrodes 71, 72 provided on the opposite surfaces of both the glass substrates 69, 70 on their inner side, and a liquid crystal substance 73 sandwiched between both the transparent electrodes 71, 72 in a sealed condition inside of both the glass substrates 69, 70. The liquid crystal substance can be sealed off by a two sided adhesive tape (not shown) or the like. The two sided adhesive tape is applied in such a manner as to thoroughly surround the outer periphery of the opposite surfaces of both the glass substrates 69, 70 on their inner side. Both the glass substrates 69, 70 may be instead formed of transmissive hard synthetic resins. The transparent electrode 71 is a common electrode and thus comprises a single electrode plate. The transparent electrode 72 is formed by an assembly of small electrodes. A thin film transistor (TFT) 74 is provided on each of the small electrodes. The small electrode is energized through leads 75, 76 for signal and scan electrodes. The common electrode requires only a single lead. A color filter 77 is interposed between the transparent electrode 71 and the upper glass substrate 69.

Polarizing plates 78,79 are respectively provided on the outer sides of both the glass substrates 69, 70, i.e., the surfaces thereof opposite to the transparent electrodes 71, 72. On the rear side of the polarizing plate 79, there is provided a backlight (not shown in FIG. 14). An arrow 80 indicates light emitted from the backlight.

The liquid crystal display board 15 combined with the backlight is called a transmission type, whereas the one including no backlight but having a reflecting plate on the rear side of the polarizing plate 79 is called a reflection type. The polarizing plate may be applied on only one side. The reflecting plate may be directly attached to the glass substrate 70 without placing the polarizing plate 79 therebetween.

The liquid crystal display board 15 thus arranged is covered with a transmissive synthetic resin, to thereby fabricate the display section which is highly resistant to moisture.

As mentioned before, the polarizing plate is susceptible to moisture. The liquid crystal substance is also susceptible to moisture. This point will now be explained.

The liquid crystal substance is sandwiched between the two glass substrates. An epoxy-base adhesive is applied to bond the joint surfaces of both the glass substrates throughout the outer periphery thereof, so that the liquid crystal substance is prevented from flowing out and is sealed off in both the glass substrates. However, moisture (water) penetrates, though gradually, the liquid crystal substance through the adhesive. The liquid crystal substance has properties of a dielectric. The penetrated moisture changes the dielectric constant and, as a result, the liquid crystal substance can no longer operate normally even if the electric field is applied thereto. It is therefore required to entirely cover the liquid crystal display board with the synthetic resin or the like for providing positive resistance to moisture.

The liquid crystal substance is also susceptible to ultraviolet rays. To prevent penetration of ultraviolet rays, a substance capable of absorbing the ultraviolet rays is added to the polarizing plate so that the liquid crystal substance may not be adversely affected by the ultraviolet rays.

The operation and advantageous effects of the above-explained embodiments of the present invention will be summarized below.

1. With the arrangement of locating the liquid crystal display section in the lower left region of the washing machine on its top surface, when a load of wet wash is put into or taken out of the tank by a right hand, water is less likely to splash over the liquid crystal display section, thereby protecting the liquid crystal display section which is susceptible to moisture.

2. With the arrangement of locating the liquid crystal display section on the rear side of the panel cover fitted to close the upper front surface of the washing machine, when the panel cover is opened, the liquid crystal display section is positioned vertically, allowing the user to easily see it, and when it is closed, the liquid crystal section is positioned on the concealed rear side of the panel cover to prevent water from splashing directly over the liquid crystal display section.

3. With the arrangement that the liquid crystal is put in a transparent case (i.e., the outer case) and sealed off by pouring a transparent resin for injection molding, the liquid crystal which is susceptible to water and moisture can be kept in a perfectly sealed condition. Use of the transparent resin make it possible to clearly view the displayed contents.

4. With the arrangement of providing an injection molding frame (i.e., the inner case) on the side opposite to the display surface of the liquid crystal, the poured resin is caused to flow or circulate in one direction, and is filled while successively purging air out of the interior, without producing bubbles. It is thus possible to prevent the appearance from being marred by air bubbles, and deterioration due to moisture contained in the air bubbles.

5. With the arrangement of locating the injection molding frame (i.e., the inner case) to extend in the longitudinal direction with respect to an injection molding case (i.e., the outer case), the poured resin is allowed to circulate rapidly. An amount of entrained air is thus reduced to more surely prevent the occurrence of air bubbles.

6. With the arrangement of providing side and bottom walls to the injection molding frame (i.e., the inner case), the resin is poured into a kind of container. Therefore, the poured resin will not leak through the side and bottom surfaces of the inner case, but is constantly allowed to flow out through an opening outlet, thereby more surely preventing the occurrence of air bubbles.

7. By properly specifying the gap between the liquid crystal display surface and the transparent case (i.e., the outer case), a flow of the poured resin is so regulated as to eliminate entrainment of air, thereby more surely preventing the occurrence of air bubbles. Further, sufficient transparency is ensured with the resin thickness between the liquid crystal display surface and the outer case.

8. With the arrangement of bonding the liquid crystal display board to the injection molding frame (i.e., the inner case), setting the assembly within the injection molding case (i.e., the outer case) in a floated state, and sealing off the assembly with the poured resin, the display surface of liquid crystal display board is not brought into direct contact with the outer case. This results in the effects of preventing the display from being impaired due to concentration of stresses onto the contact portions, and preventing the occurrence of air bubbles or separation between the poured resin and liquid crystal display board or the outer case.

9. In the arrangement of sealing off the liquid crystal display board with the transparent poured resin, connecting parts on the liquid crystal display board to the control substrate for driving, and further sealing off the control substrate through injection molding of another resin, by leaving a gap between the poured resin surrounding the liquid crystal display board and the poured resin surrounding the control substrate, there is obtained the effect of reducing a pressure produced due to differences in coefficients of thermal expansion of two types of the poured resins. Simultaneously, there is also obtained the effect of allowing escape of the gas produced from the transparent poured resin surrounding the liquid crystal display board when exposed to high-temperature, high-moisture environments for a long time, making it possible to more surely suppress the occurrence of separation or air bubbles. These effects resulting from the presence of the air gap are further improved by not sealing off air in the gap and communicating the air to the atmosphere through a communicating pipe or the like.

10. By properly specifying the volume of the injection molding frame (i.e., the inner case), the resin for injection molding is not required to be poured twice, but can be molded satisfactorily by a single step of pouring work. As a result, the time necessitated for the pouring work is cut down.

11. By properly specifying the gaps between the liquid crystal display board and the transparent case (i.e., the outer case) in both the longitudinal and transverse directions, the circulating route for the poured resin is optimized to eliminate entrainment of air due to flooding or disturbance of the resin, thereby more surely preventing the occurrence of air bubbles.

12. Both the liquid crystal display board and the backlight are susceptible to water and moisture. With the arrangement of housing the whole of the liquid crystal display board and the backlight in the transparent case (i.e., the outer case) and sealing it off with the transparent poured resin, however, a resulting liquid crystal indicator can be made superior in resistance against moisture and the display section can be made easier to see.

13. In consideration of the backlight (with EL) being sealed off with the poured resin, an anti-moisture material required to wrap it when used alone, i.e., a package film, can be dispensed with. This contributes to reduce the cost, prevent the wrapped surface from being wrinkled when the package film is applied, and further facilitate bonding of a two-sided adhesive tape or the like.

14. In the arrangement that the liquid crystal display board is combined with the backlight (with EL) and this assembly is sealed off with the poured resin by injection molding, if the poured resin penetrates the gap between the liquid crystal display board and the backlight, stains would be produced on the light emitting surface to mar the appearance. Therefore, a transparent two sided adhesive tape is bonded to the outer peripheral edges of the liquid crystal display board and the backlight, so that the poured resin is prevented from penetrating the gap therebetween to avoid deterioration in the appearance due to stains or the like.

15. By joining the liquid crystal display board and the backlight (with EL) using a frame formed of a foam with a two sided adhesive tape, the surface of the backlight which is hard to present a precise flatness, can be perfectly bonded to the liquid crystal display board throughout their outer peripheral edges, whereby the poured resin is prevented from penetrating the light emitting surface to avoid deterioration in the appearance due to stains or the like produced by such penetration of the poured resin.

16. In many cases, the liquid crystal display board and the backlight (with EL) are combined in back-to-back relation. However, they cannot be energized using a single common power supply because rated voltages and frequencies are different from each other. With the arrangement of providing spare pins (meaning pins which are not connected in a circuit with the liquid crystal display board) on the liquid crystal display board and electrically connecting the control substrate to terminals of the backlight through the spare pins, the need of cables and connecting terminals dedicated to the backlight is eliminated and reliability of connections made by direct soldering can be improved.

17. By utilizing terminals of the liquid crystal display board and directly soldering or so forth to patterns on the control board, reliability of connections is ensured and the entire control substrate including the liquid crystal display board can be compacted.

18. With the arrangement of setting the entire control substrate including the liquid crystal display board into the substrate case and sealing it off with the transparent poured resin, the control substrate including the liquid crystal display board can be obtained which is superior in anti-moisture resistance and allows the user to see the display contents in clear form.

19. By directly connecting the display crystal indicator sealed off with the transparent poured resin to the patterns on the control substrate, housing the entire assembly into the substrate case, and sealing off the liquid crystal display board doubly with another type of poured resin, anti-moisture resistance of the liquid crystal display board is ensured and the amount of the transparent poured resin to be used is limited to promote a cost reduction.

20. With the arrangement of inserting engagement pins on the transparent case side into engagement holes on the control substrate side, the connecting pins on the liquid crystal display board can be precisely aligned with the patterns on the control substrate, allowing the two members to be easily interconnected by direct soldering without holding the liquid crystal display board by hand.

21. By using a cable (such as an FPC) and a connector to electrically connect between the liquid crystal display board and the control substrate, the liquid crystal display section can be moved at any desired location to widen the display area. Also, removable attachment of the liquid crystal display board to the control substrate results in the improved serviceability.

22. While liquid crystals are able to present abundant indications, it is important that these indications are displayed in relation to the functions of a washing machine and depressing of operating buttons for easy understanding. The washing machine which makes it easy to see the displayed information and is convenient to use can be obtained by locating the sensor detection indication and the progress indication in an upper area, the full automatic course indication in a lower left area, the timer indication in a lower right area, and the water level indication in a lower central area, respectively.

23. With an arrangement of dividing the transparent case (i.e., the outer case) for injection molding into two parts by a partition with an opening formed in its bottom edge, housing the liquid crystal display board in one of the divided parts, and pouring the resin for injection molding into the other divided part, the poured resin flows through the opening at the bottom edge of the partition in one direction to surround and seal off the liquid crystal display board. Thus, the resin is not disturbed so as to entrain air, and deterioration in the appearance due to the occurrence of air bubbles is eliminated.

24. By joining the liquid crystal display board and the transparent case (i.e., the outer case) using a two sided adhesive tape pasted thereto, the poured resin is prevented from penetrating therebetween, which in turn prevents the appearance from being impaired due to air bubbles, stains or the like.

According to the present invention, as described above, the surface of the liquid crystal display board is covered with an anti-moisture transmissive synthetic resin. As a result, the intrusion of moisture is prevented, the liquid crystal display board will not become moist, and further a failure in the liquid crystal display will not occur.

What is claimed is:

1. A liquid crystal display wherein an outer case is formed of a transmissive hard synthetic resin, a liquid crystal display board is housed in said outer case in a floating state relative to an inner bottom surface of said outer case, and surroundings of said liquid crystal display board are covered with a transmissive synthetic resin poured into said outer case; and
    wherein a fluid reservoir is provided on an inner side of an inner case disposed in said outer case and contacting said liquid crystal display board, and said inner case is fixedly jointed to said liquid crystal display board by an adhesive applied to said fluid reservoir.

2. A liquid crystal display according to claim 1, wherein the depth of said outer case is larger than the depth of said liquid crystal display board.

3. A liquid crystal display according to claim 1, wherein the upper ends of peripheral walls constituting said outer case are higher that the upper surface of said liquid crystal display board descended into said outer case.

4. A liquid crystal display wherein an upper glass substrate and a lower glass substrate are provided in a facing relation, transparent electrodes are respectively provided on opposite surfaces of said glass substrates on their inner side, a liquid crystal substance is interposed between said transparent electrodes and sealed between said glass substrates, and first connecting terminal pins for connecting said transparent electrodes to the exterior are provided at an edge of one of said glass substrates, thereby constituting a liquid crystal display board;

wherein an outer case is formed of a transmissive hard synthetic resin, said liquid crystal display board is housed in said outer case such that the display surface of said liquid crystal display board faces an inner bottom surface of said outer case, a backlight formed by an electroluminescent illuminant is on the rear side of said liquid crystal display board, and second connecting terminal pins for said backlight which are not connected to said transparent electrodes are provided on said liquid crystal display board together, said backlight being connected to an external circuit for energization through said second connecting terminal pins for said backlight;

wherein a control substrate for controlling the driving of various loads is provided, a connecting portion is provided on said control substrate, and said connecting portion is directly contacted with said first and second connecting terminal pins for interconnection therebetween;

wherein a substrate case is provided, said liquid crystal display board and said control substrate are housed in said substrate case, and a synthetic resin is poured into said substrate case to mold said liquid crystal display board and said control substrate together;

wherein a gap is left partially or entirely between a transmissive synthetic resin poured into said outer case and an inner side of an inner case disposed in said outer case and contacting said liquid crystal display board; and wherein said gap is directly communicated with the atmosphere through a communicating pipe.

5. In a liquid crystal display wherein an outer case is formed of a transmissive hard synthetic resin, and a liquid crystal display board housed in said outer case is molded by pouring a liquid transmissive synthetic resin, the improvement wherein said outer case is divided into two spaces by a partition, a flow passage allowing the liquid synthetic resin to flow therethrough is formed in a lower edge of said partition, said liquid crystal display board is housed in one of the divided spaces, and the liquid synthetic resin is poured into the other divided space.

6. A liquid crystal display wherein an upper glass substrate and a lower glass substrate are provided in a facing relation, transparent electrodes are respectively provided on opposite surfaces of said glass substrates on their inner side, a liquid crystal substance is interposed between said transparent electrodes and sealed between said glass substrates, and first connecting terminal pins for connecting said transparent electrodes to the exterior are provided at an edge of one of said glass substrates, thereby constituting a liquid crystal display board;

wherein an outer case is formed of a transmissive hard synthetic resin, a liquid crystal display board is housed in said outer case such that the display surface of said liquid crystal display board faces an inner bottom surface of said outer case, a backlight formed by an electroluminescent illuminant is on the rear side of said liquid crystal display board, and second connecting terminal pins for said backlight which are not connected to said transparent electrodes are provided on said liquid crystal display board together, said backlight being connected to an external circuit for energization through said second connecting terminal pins for said backlight;

wherein a control substrate for controlling the driving of various load is provided, a connecting portion is provided on said control substrate, and said connecting portion is directly contacted with said first and second connecting terminal pins for interconnection therebetween;

wherein a substrate case is provided, said liquid crystal display board and said control substrate are housed in said substrate case, and a synthetic resin is poured into said substrate case to mold said liquid crystal display board and said control substrate together;

wherein a gap is left between the synthetic resin poured into said substrate case and a part or the whole of either an outer side of an inner case disposed in said outer case and contacting said liquid crystal display board or a transmissive synthetic resin disposed on the outer side of said inner case; and wherein said gap is directly communicated with the atmosphere through a communicating pipe.

7. A liquid crystal display comprising:

an outer case made of a transparent hard synthetic resin;

an inner case having support pins provided on an outer peripheral edge of the inner case; and a liquid crystal display board mounted on the inner case;

wherein the inner case is disposed in the outer case and is supported by the outer case by means of the support pins such that the liquid crystal display board is between the outer case and the inner case and there is a gap between the liquid crystal display board and an inner surface of the outer case; and wherein the gap between the liquid crystal display board and the inner surface of the outer case is filled with a transparent synthetic resin poured into the outer case.

8. A liquid crystal display according to claim 7, wherein the outer case includes supports provided on an outer peripheral edge of the outer case, the supports of the outer case engaging the support pins of the inner case.

9. A liquid crystal display comprising:

an outer case made of transparent hard synthetic resin;

a liquid crystal display board disposed in the outer case such that there is a gap between the liquid crystal display board and an inner surface of the outer case; and an inner case disposed in the outer case such that the liquid crystal board is between the outer case and the inner case, the inner case having a protruding portion provided on a peripheral edge of the inner case, the protruding portion defining a space and being provided with a pouring port;

wherein the gap between the liquid crystal display board and the inner surface of the outer case is filled with a transparent synthetic resin poured into the space defined by the protruding portion, the transparent synthetic resin filling the gap having flowed into the outer case from the space defined by the protruding portion through the pouring port.

10. A liquid crystal display according to claim 9, wherein the protruding portion of the inner case is provided with an air reservoir communicating with a space between the inner case and the inner surface of the outer case.

11. A liquid crystal display according to claim 10, further comprising a communicating pipe disposed on the protruding portion of the inner case and communicating the air reservoir with the atmosphere.

12. A liquid crystal display according to claim 11, wherein an amount of the transparent synthetic resin poured into the space defined by the protruding portion is such that the air reservoir is not filled by the transparent synthetic resin when the transparent synthetic resin has flowed into the outer case from the space defined by the protruding portion through the pouring port.

13. A liquid crystal display comprising:
an outer case made of a transparent hard synthetic resin;
an inner case having contact ribs projecting from a surface of the inner case; and
a liquid crystal display board mounted on the contact ribs;
wherein the inner case is disposed in the outer case such that the liquid crystal display board is between the outer case and the inner case and there is a gap between the liquid crystal display board and an inner surface of the outer case; and
wherein the gap between the liquid crystal display board and the inner surface of the outer case is filled with a transparent synthetic resin poured into the outer case.

14. A liquid crystal display according to claim 13, wherein the liquid crystal display board is bonded to the contact ribs with an adhesive.

15. A liquid crystal display according to claim 13, wherein the contact ribs are arranged to define at least one fluid reservoir between a plurality of the contact ribs, and wherein the at least one fluid reservoir is filled with an adhesive which bonds the liquid crystal display board to the contact ribs.

16. A liquid crystal display comprising:
an outer case made of a transparent hard synthetic resin;
an inner case having
support pins provided on an outer peripheral edge of the inner case,
contact ribs projecting from a surface of the inner case, the contact ribs being arranged to define at least one fluid reservoir between a plurality of the contact ribs, the at least one fluid reservoir being filled with an adhesive, and
a protruding portion provided on a peripheral edge of the inner case, the protruding portion defining a space and being provided with a pouring port and an air reservoir;
a liquid crystal display board bonded to the contact ribs by the adhesive in the at least one fluid reservoir, the contact ribs maintaining a gap between the liquid crystal board and the surface of the inner case;
wherein the inner case is disposed in the outer case and is supported by the outer case by means of the support pins such that
the liquid crystal display board is between the outer case and the inner case,
there is a gap between the liquid crystal display board and an inner surface of the outer case, and
the air reservoir communicates with a space between the inner case and the inner surface of the outer case; and
wherein the gap between the liquid crystal board and the surface of the inner case and the gap between the liquid crystal display board and the inner surface of the outer case are filled with a transparent synthetic resin poured into the space defined by the protruding portion, the transparent synthetic resin filling the gaps having flowed into the outer case from the space defined by the protruding portion through the pouring port;
the liquid crystal display further comprising a communicating pipe disposed on the protruding portion of the inner case and communicating the air reservoir with the atmosphere.

17. A liquid crystal display comprising:
an outer case made of a transparent hard synthetic resin;
a liquid crystal display board disposed in the outer case such that there is a gap between the liquid crystal display board and an inner surface of the outer case;
an inner case disposed in the outer case such that the liquid crystal board is between the outer case and the inner case; and
a backlight including an electroluminescent illuminant, the backlight being disposed between the liquid crystal board and the inner case;
wherein the gap between the liquid crystal display board and the inner surface of the outer case is filled with a transparent synthetic resin poured into the outer case.

18. A liquid crystal display according to claim 17, wherein the backlight further includes terminals, and wherein the liquid crystal display further comprises:
first connecting terminal pins provided at an edge of the liquid crystal display board for connecting the liquid crystal display board to a circuit outside the outer case for driving the liquid crystal display board; and
second connecting terminal pins provided at the edge of the liquid crystal display board and connected to the terminals of the backlight for connecting the backlight to a circuit outside the outer case for driving the backlight.

19. A liquid crystal display comprising:
a case made of a transparent hard synthetic resin;
a partition disposed in the case, the partition dividing the case into a first space and a second space;
a passage between the first space and the second space;
a liquid crystal display board disposed in the case in the second space; and
a transparent synthetic resin poured into the case into the first space, the transparent synthetic resin fixing the liquid crystal display board in the case in the second space, the transparent synthetic resin having flowed into the second space through the passage between the first space and the second space.

* * * * *